July 14, 1970  D. RUBENSTEIN  3,520,749
METHOD OF MAKING FILAMENT WOUND REINFORCED CONCRETE PIPE
Filed May 15, 1967  7 Sheets-Sheet 1

INVENTOR.
BY David Rubenstein

INVENTOR.
David Rubenstein

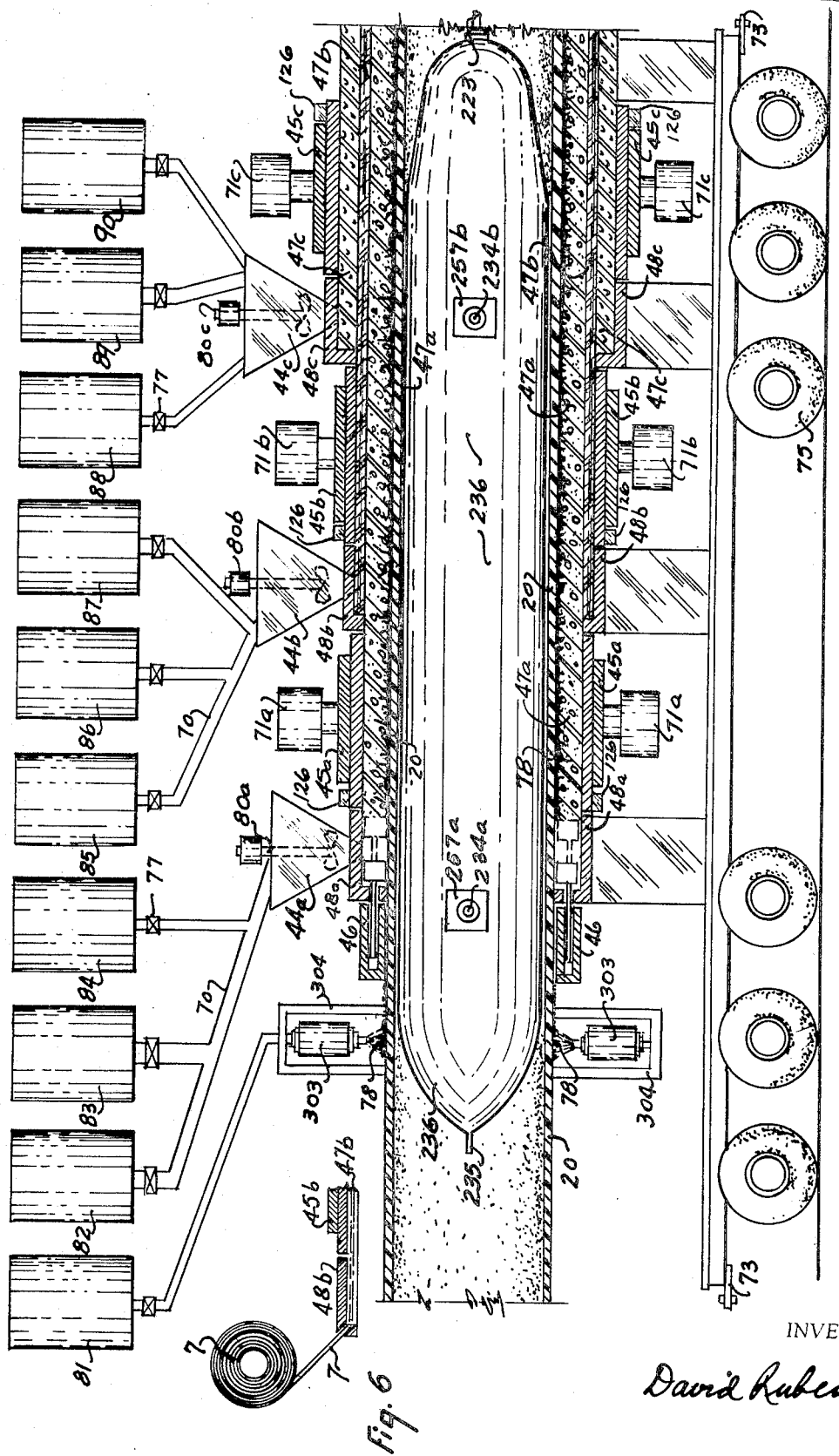

July 14, 1970

D. RUBENSTEIN 3,520,749

METHOD OF MAKING FILAMENT WOUND REINFORCED CONCRETE PIPE

Filed May 15, 1967

INVENTOR.

David Rubenstein

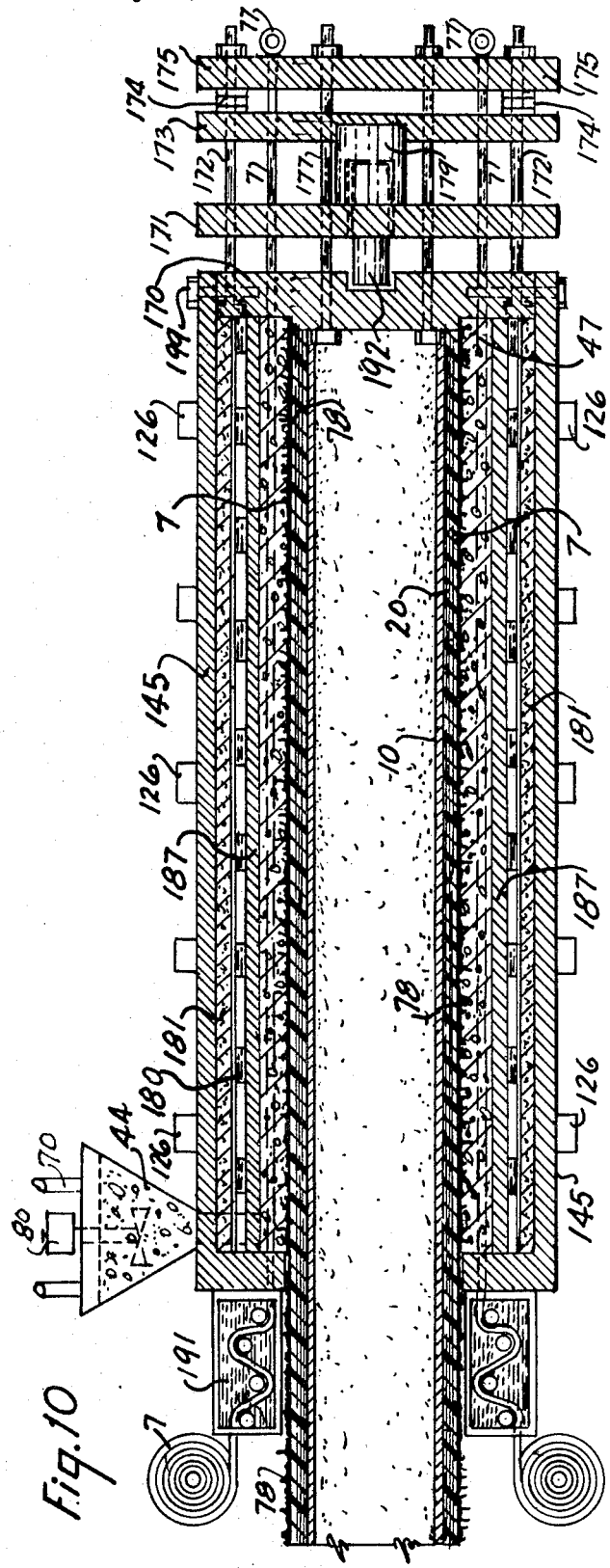
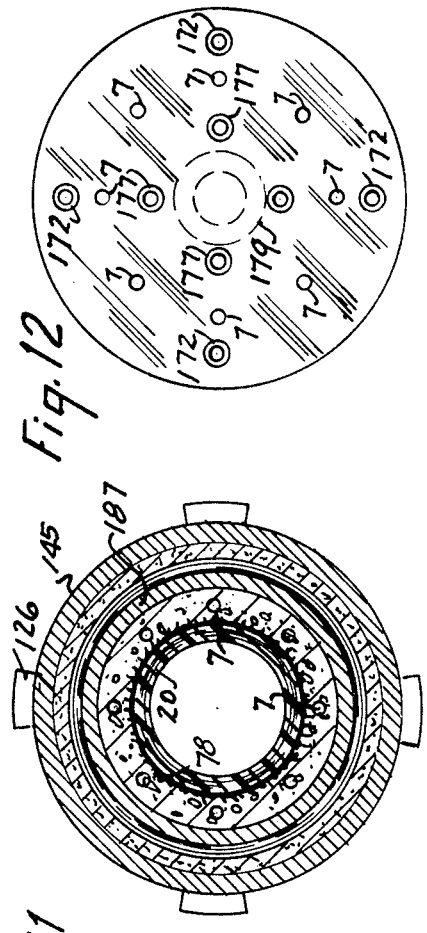
Fig.10
Fig.11
Fig.12
INVENTOR.
David Rubenstein

INVENTOR.
David Rubenstein

United States Patent Office 3,520,749
Patented July 14, 1970

3,520,749
METHOD OF MAKING FILAMENT WOUND
REINFORCED CONCRETE PIPE
David Rubenstein, San Diego, Calif., assignor to Chem Stress Industries, Inc., a corporation of California
Continuation-in-part of application Ser. No. 613,398, Jan. 31, 1967. This application May 15, 1967, Ser. No. 644,749
Int. Cl. B65h 81/08; B29b 21/64
U.S. Cl. 156—173                         15 Claims

ABSTRACT OF THE DISCLOSURE

This patent application relates to apparatus for making and methods of making prestressed reinforced composite extruded and laminated concrete pipe. Filament wound and otherwise provided fiber constructions and fillers covered with and impregnated with polymerizable polymeric resin compositions comprising pipeliners are combined and laminated with polymerizable polymeric resin composition interface bonding resin compositions to and with polymerizable polymeric resin composition bound sand, or minerals, or particles, or aggregates, or concrete into prestressed reinforced composite concrete pipe. The method involves winding or otherwise providing pipeliners to which interface bonding resin composition and extruded materials are combined and laminated and prestressed into unitary prestressed preloaded composite materials concrete pipe. The apparatus comprises means for making unitary by combining, laminating prestressing, and extruding the materials of the invention. The product made is prestressed preloaded composite reinforced concrete pipe.

---

This patent application is a continuation-in-part to my copending patent applications Ser. No. 613,393, filed Jan. 31, 1967, Ser. No. 522,336, filed Oct. 24, 1965, now Pat. No. 3,380,259, Ser. No. 517,160, filed Dec. 28, 1965, now Pat. No. 3,384,522, and Ser. No. 427,861, filed Jan. 25, 1965, and now U.S. Pat. No. 3,340,115, which application is a division of my then copending patent application Ser. No. 702,050, filed Dec. 11, 1957, a portion of which is now U.S. Pat. No. 3,177,902.

SUMMARY

This patent application relates to improvements made in the art of concrete pipe manufacture and provides a composite material extruded-laminated concrete pipe. In combination reinforced plastic constructions are combined with concrete a provide high strength or functional featured concrete pipe, conduits, deep well pipe, piling and pipe useful to atomic energy uses. In combination, filament or otherwise provided reinforced plastic constructions are combined with extruder-laminated polymeric resin bound aggregate and reinforcing materials to make the pipe of the invention. Machines and apparatus and methods of using the same are disclosed. The pipe of the invention are exampled by high pressure systems, water systems, irrigation systems, sewer system, oil, gas, and chemical pipe systems.

This patent application relates to improvements in the manufacture of reinforced composite extruded-laminated concrete pipe, and in particular, discloses and claims novel and useful features, product, method of making and apparatus useful in making this pipe. In combination, filament wound or otherwise provided reinforced plastic constructions are combined with composite extruded-laminated composite materials concrete pipe. This invention is particularly useful in the manufacture of service lines exampled by high pressure systems, water systems, irrigation systems, sewer systems, and oil, gas, and chemical pipe systems.

Further, this invention provides features of both factory type manufacture and on-site manufacture of composite concrete pipes, tanks, and vessels.

An object of this invention is to increase the functionality of composite concrete pipe and reduce the cost of making such pipe.

An object of this invention is to improve features of my prior established art with extruded-laminated reinforced composite concrete pipe.

By definition herein, the word "concrete" is broadly defined as such material being "any bound aggregate structural material" capable of being used in various embodiments of this invention. The bound aggregate structural material utilized in this invention can be made out of any portland cement concrete material, or clay material, and particularly can be material in the form of a member of the group consisting of polymeric resin composition bound concrete, lightweight concrete, perlite concrete, fire expanded clay aggregate concrete, fire expanded shale aggregate concrete, processed cinder concrete, volcanic cinder concrete, river run gravel and crushed rock aggregate material, pit-excavated crushed rock aggregate material, silica sand, washed aggregate sands, and in fact any natural or man-made aggregate products having the required engineering materials strengths in any specific structural design of the invention can be used. Each raw material of the concrete in the broad definition terms used herein is used in a balanced designed structural engineering manner adapted to its own particular features in said use. Concrete utilizing polymerizable polymeric resin hereinafter called "Resin-crete" and elastomeric compositions hereinafter called Elastomer-crete as the bonding material may be used wherein all portland cement is omitted from the mixture, and/or portions of the portland cement varying in proportion being provided with non-cementitous cements, as for example, polymerizable polymeric resins and elastomers as thermoplastic and thermosetting materials, and combinations thereof, including rubbers. Combinations of capable and compatible thermoplastic and thermosetting and rubber materials may be used for their structural properties and for co-reactive properties in specific formulations as binders, surfaces, and components of structure of concrete pipe line materials of this invention.

The composite structure pipe construction comprises the extrusion-sandwiching and extrusion-laminating as well as the chemical and mechanical dispersion of cements, aggregates and materials to integrate and laminate and compose into structure the various materials used. By using materials having structural, chemical, resistance, and other characteristics having specific functions in specific type embodiments of this invention uses normal to the materials or modified uses unique to this invention of said materials, provide useful embodiments of this invention. By methods using means and utilizing casting, membering, joining, assembling and incorporation by extrusion-sandwiching and by extrusion-laminating, component parts, pieces, units, fabrics, binders, fillers, glass fiber rovings, glass fiber strands, glass fiber roving in woven form, glass fiber mats, glass fiber cloth, unidirectional glass fibers, undirectional glass fiber mats, natural fibers, synthetic fibers, sisal fibers, hemp, nylon, butyl rubber, wood fibers, wood pieces, bamboo, asbestos fillers, asbestos fibers, steel wire, woven wire, wire cables, rods, perforated metal, metal reinforcements of any kind of metal, plastics, plasters, crushed rocks, silica sand, minerals, sand, portland cements, natural cements, and any other materials whose final end use properties, and functional characteristics add to, comprise, make, constitute, cast, laminate, or incorporate added strength in tension, compression, shear, and torsion, provide new and novel composite improvements. In particular, materials useful in resistance to abrasion, or to acids or alkalies are useful materials. Pigments and pigments as fillers, e.g., iron oxide, titanium oxide, and chrome oxide and various clays are useful fillers. Metal powders, e.g., lead powder, or particles, or chips, are useful in pipe lines used for work by the Atomic Energy Commission or the like.

Thus an object of this invention is to utilize new materials and methods to improve the structure of concrete pipe lines and particularly offer new pipe line materials called "Resincrete" and "Elastomercrete," concretes made with polymerizable polymeric resins and elastomers and rubbers being used for the binders. The invention takes advantage of the prior art in both precast and cast-in-place concrete pipes with improvements thereto.

These and other objects will be apparent from the drawings and the following description thereof. Referring to the drawings and the following description, the drawings which are for illustrative purposes of embodiments of the invention:

FIG. 5 is an elevation and sectional view of a plant to make extrusion-laminated composite concrete pipe;

FIG. 6 is a detail of placing unidirectional reinforcement of FIG. 5;

FIG. 10 is a longitudinal section of an extrusion-laminating machine combined with a prestressing apparatus for making mechanically prestressed embodiments of the invention;

FIG. 11 is a cross-section of FIG. 10 taken through the extruder-laminating machine;

FIG. 12 is an end view of the prestressing apparatus of FIG. 10;

In my patent application Ser. No. 522,336, filed Oct. 24, 1965, now copending, I disclose and claim apparatus, methods of making and product made in the manufacture of reinforced composite concrete pipe line constructions. The use of existing concrete placing machines is utilized in combination with the new art of the said invention. Features of the same are combined herein.

In my patent application Ser. No. 391,987, filed Aug. 25, 1964, and now U.S. Pat. No. 3,250,654, I disclose and claim a reinforced plastic pipe-liner ready for use in the manufacture of composite concrete pipe. In this application I extend the use of such pipe-liners in the manufacture of new and novel pipe constructions by extrusion-sandwiching and extrusion-laminating of materials of the invention.

In my patent application filed Dec. 28, 1965, Ser. No. 517,160, I disclose and claim product and method of making and apparatus therefor in the extrusion-sandwiching and extrusion-laminating of Composite-Decorative-Structural-Elements and Slabs. I extend the knowledge of that prior art to improved features in this invention.

In my patent application Ser. No. 613,398, filed Jan. 31, 1967, I disclose and claim product and method of making and apparatus therefor in the manufacture of reinforced composite concrete pipe constructions including subject matter on "Elastomercrete" and "Resincrete" concrete pipe constructions. In this application I extend this disclosure and additional methods of making such pipe.

In my patent application Ser. No. 427,861, filed Jan. 25, 1965, now U.S. Pat. No. 3,340,115, I disclose and claim basic methods of making reinforced composite concrete pipe constructions.

Figure 1:
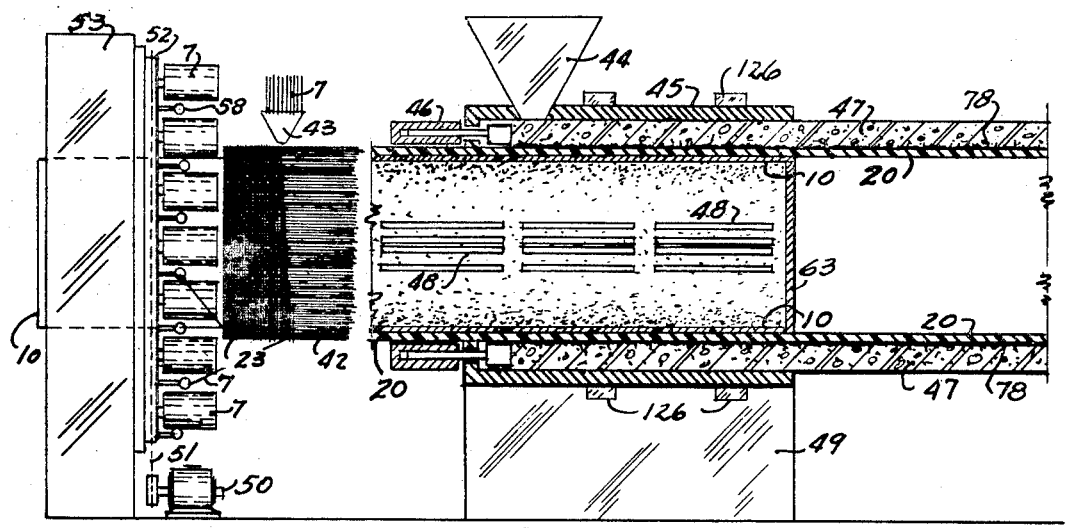
FIG. 1 is an elevation and sectional view of apparatus and product showing extrusion-laminating means.

FIG. 1 shows the method of making a composite concrete pipe by means of an extrusion-laminating and extrusion-sandwiching apparatus. A fixed mandrel 10 as disclosed in my patent application Ser. No. 391,987, filed Aug. 25, 1964, and now U.S. Pat. No. 3,250,654, shows glass fiber roving 7 applied as unidirectional strands 42 held in place by circular strands 23. These strands are applied from spinning device 52 driven by motor 51. The spinning device is supported by frame 52 which supports mandrel 10.

Mandrel 10 has an end closure 63 and is heated to selected temperatures by means of heater 48 operated by thermostat not shown. An extruder body 45 is disposed around and about the pipe liner 20 and spaced a desired distance so that the "Resincrete" concrete 47 is extruded at a thickness meeting a design, e.g., ½" thick, 1" thick, 2" thick or 4" thick, or other thickness meeting a specific design.

The "Resincrete" concrete is applied from feed hopper 44 and is compacted by means, e.g., vibrator 126 and/or e.g., hydraulic means 46. The "Resincrete" concrete has a polymerizable polymeric resin composition which sets rapidly, e.g., one minute, or 3 minutes, or other designed time. The polymerizable polymeric resin composition binds and bonds the aggregates of the mixture together as well as bonds the "Resincrete" concrete to the pipe liner 20. The hydraulic means 46 acting against the "Resincrete" concrete and against the extruder faces forces the composite concrete pipe forward so additional material can be poured from vessel 44 into extruder body 45. The bonded structure of the pipe liner 20 and "Resincrete" concrete 47 acts as a unitary body and moves forward under the push of the hydraulic means 46. Thus a completed pipe is extruded.

Figure 2:
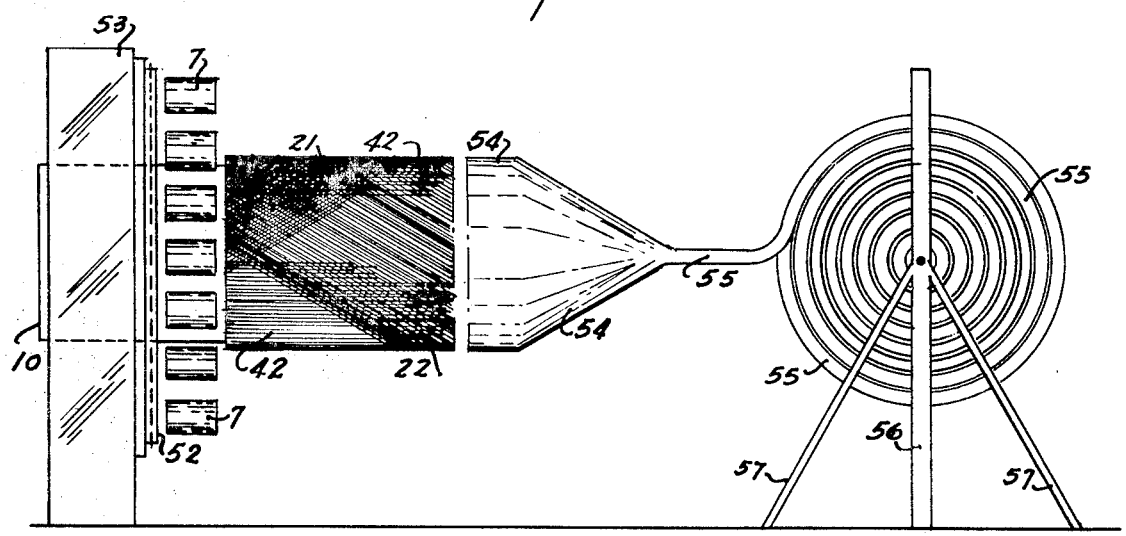
FIG. 2 is an elevation of a portion of the filament winding means showing the take-off of a filament wound pipe-liner and rolling up on a reel.

FIG. 2 shows a real-unit 56 means of storing glass fiber or other fiber or material reinforcing 55 on said reel-unit. Glass fibers as filaments 7 are shown placed on mandrel 10 as longitudinal strands 42 covered with helical strands 22 and opposite helical strands 21. The laminate 20 is formed with B-staged (partially cured) preimpregnated polymeric resin composition fiber construction 54 which is rolled up into a flattened tube 55 and reeled up on reel 56 which has supports 57. The reeled up laminated construction is ready-for-use and is shown being used in FIG. 4.

Figure 3:
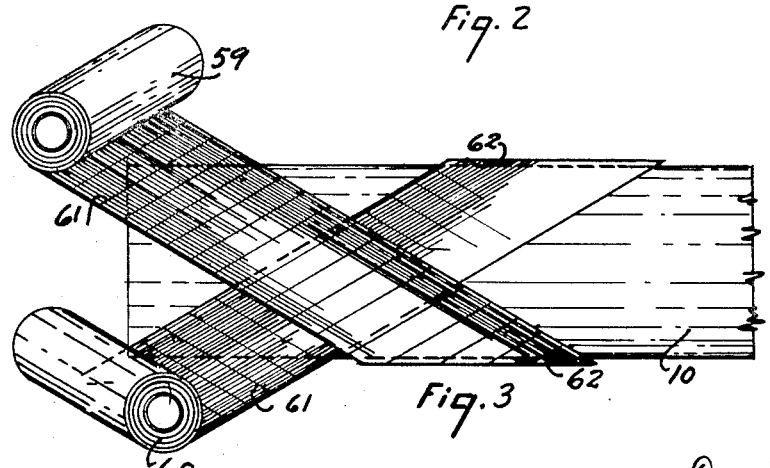
FIG. 3 shows the use of a filament fabric having unidirectional strands held together by spaced apart cross strands being wrapped around a mandrel to make a pipe-liner.

FIG. 3 shows another winding construction utilizing wide rolls of unidirectional roving glass fibers 59 and 60 which come as made in weights of e.g., 1 oz. per sq. ft., 2 oz. per sq. ft., and 3 oz. per sq. ft., or in other discrete weights as ordered. To keep the unidirectional strands in organized alignment, say 100 rovings to the inch of width, e.g., 20 strands to the roving, the longitudinal strands are bound together say every 6″ by a cross strand of glass fiber fastened by an adhesive. This is a Ferro Corp. product called "Ferro-Nuf." By providing a handling means not shown, these filament fabrics can be wound about a mandrel 10 and rapidly provide glass fiber reinforcing to make reinforced plastic pipe and pipe-liners. Polymerizable polymeric resin composition is applied by various means known and as herein disclosed and the combination of fiber and resin provides a pipe-liner of the invention.

Figure 4:
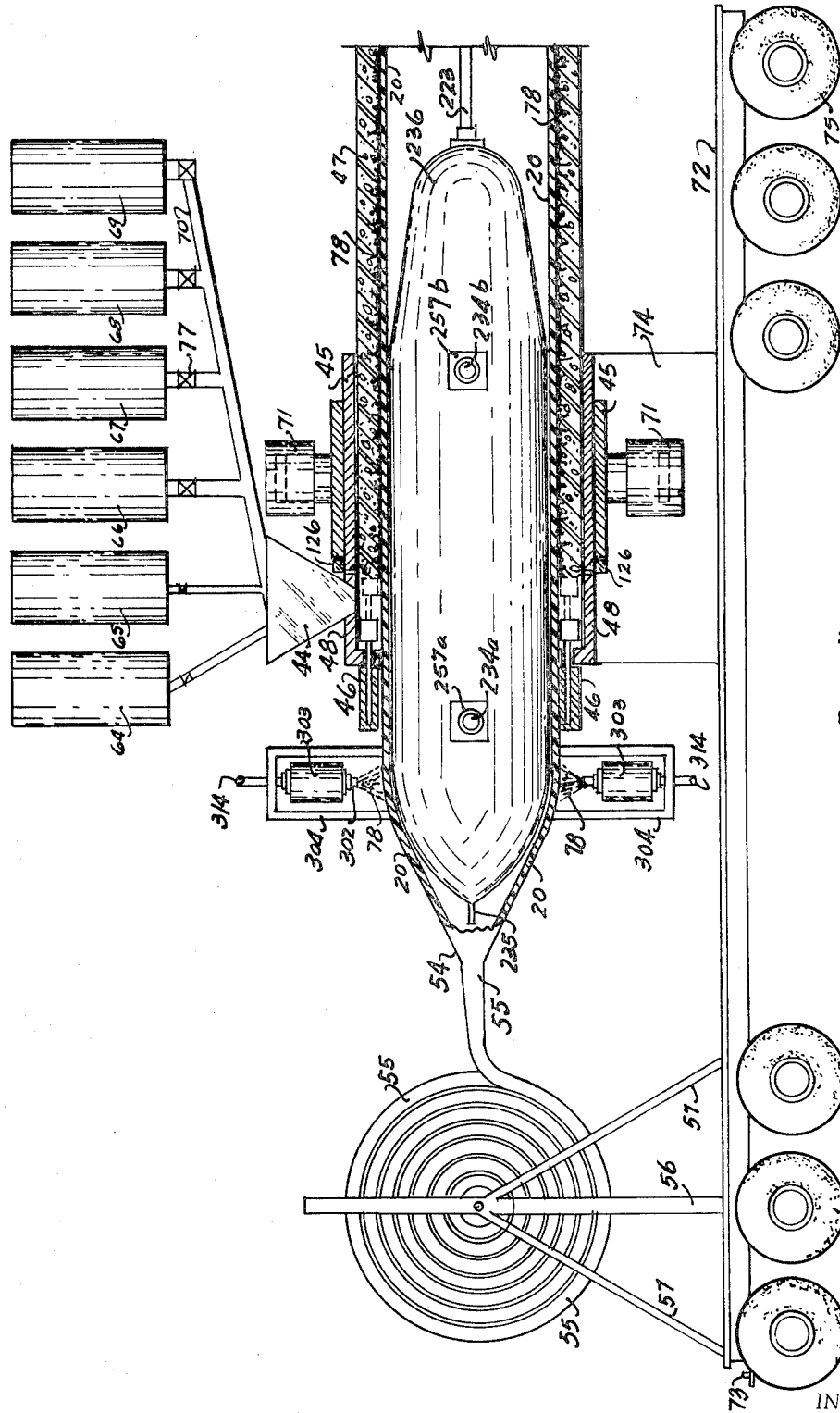
FIG. 4 is an elevation and sectional view of a portable plant using reels of ready-for-use pipe line being processed about a floating mandrel and through an extrusion apparatus to make composite concrete pipe on site.

FIG. 4 shows a method of making a composite concrete pipe on a machine utilizing the reel-unit of FIG. 2 and an extrusion-laminating device. The pipe-liner 20 is unrolled from the reel-unit 56 onto floating mandrel 236 which has an air nozzle 235 which provides inflation means. The outside surface of pipe-liner 20 is sprayed with bonding resin 78 from spray means 303 located in holding means 304. Spray nozzle 302 is adjustable to different polymeric resin compositions. Extruder body 45 encloses the circular body of the pipe-liner 20 as disposed over the floating mandrel 236. Pressure means 71 compresses the extruder body to the pipe-liner 20 and against the concrete material 47 which is poured from vessel 44 into compression chamber 48. Hydraulic or equivalent means 46 and vibrator 126 consolidates and compresses the concrete material into extruder body 45. Bonding resin composition 78 sets and bonds the concrete material 47 to the glass fiber reinforced plastic pipe-liner 20 under the pressure of pressure means 71 of extruder body 45. The completed composite concrete pipe is forced forward by the hydraulic means 46.

The vessels 64, 65, 66, 67, 68, and 69 contain polymeric resin compositions or sand or aggregates selected to make specific formulations of concrete or "Resincrete" concrete mixtures. The specific selected materials are fed into transfer chute 70 by valves 77 in accordance with a formula. Weigh means not shown are used to weigh components of the formula. Floating mandrel 236 is held in place by pressure means 71 during the filling of the extrusion cavity. On cycle controlled by apparatus not shown the pressure is released so that forward movement can be had of the finished pipe. The extruded pipe can be then cut to lengths or can be disposed directly into a trench in long lengths. By design the finished pipe can be resilient and bend without damage.

The floating mandrel 236 is shown with inflation hose means 223 from an air compressor not shown. Pipe-liner 20 is inflated from nozzle 235.

The apparatus is shown mounted on a trailer for use in the field for supplying a composite concrete pipe directly into a trench. Alternatively, the apparatus can be used in fixed position as in a factory set-up. Different sized mandrels made in stock sizes complete the plant.

If the concrete mixture 47 is conventional portland cement concrete, e.g., 5,000 p.s.i. concrete, the extruded composite concrete pipe is placed in a steam curing chamber not shown or is otherwise cured. If the concrete mix 47 is "Resincrete" concrete of my invention the composite pipe is cured as it leaves the extruder-laminating device and comprises an extruded-sandwich construction. "Resincrete" concrete formulations are disclosed herein.

FIG. 5 shows a method of making a composite concrete pipe having a plurality of laminated layers that are extruded-sandwich laminated constructions. Pipe-liner 20 is fed onto floating mandrel 236 from a making source. Spray unit 303 supported in frame 304 emits bonding resin composition spray 78 onto pipe-liner 20 as it is fed into the extruder chamber 48a. Concrete mix 47 or "Resincrete" concrete 47a is mixed in vessel 44a by mixer 80a and fed into extruder chamber 48a. The hydraulic means 46 and vibrator 126 consolidates and compresses the concrete mix into the chamber 45a which is compressed by pressure means 71a. The bonding resin 78 bonds the concrete mix to pipe-liner 20 and unites it into a unitary body with the pipe-liner 20. Hydraulic means 46 forces the composite pipe body forward into extruder chamber 48b and under extruder body 45b. A second layer 47b is mixed in chamber 44b by mixer 80b and poured into chamber 45b. Pressure from pressure unit 71b compresses the material and adheres it to the concrete of 47a. This layer can be a glass fiber reinforced filler loaded polymeric resin composition having a specific design function such as e.g., a lead filler epoxy resin composition for use as radioactive barrier. It can be a layer for obtaining impermability, or water-tight structure, or insulation against cold or heat, or be a high strength pressure resistant layer, in fact any designed construction. If the reinforcements are linear such as prestressing reinforcement a different apparatus, FIG. 6 comprising a reel-unit of the continuous reinforcement is fed into the extruder and prestressed by means of hydraulic jacks or by the use of a resin composition having a shrinkage. The continuous reinforcement can vary in uses and be either steel or fibrous constructions. The extruder body in this embodiment is provided with anchorage devices for holding the reinforcement in a prestressing preloading construction.

With laminated layer 47b in position the composite pipe body is advanced under extruder body 48c and extruder chamber 45c. A third layer 47c is mixed by mixer 80c in vessel 44c and poured into extruder body 48c and under and into extruder body 45c where pressure is provided by pressure unit 71c. This layer can be a polymeric resin bound concrete, e.g., "Resincrete" or "Elastomercrete" having resistance to e.g., acid soil, or alkali soil, or adverse chemicals, etc. By means of the pressure means 71c a dense and hard body can be made, or a resilient but tough body can be made depending upon the characteristics of the particular resin or elastomer formulation made.

In both FIGS. 4 and 5, elements 257a and 257b and 234a and 234b show features disclosed in my copending application Ser. No. 522,336, filed Oct. 24, 1965 now U.S. Pat. No. 3,380,259. The holding in position of mandrels 236 inside of a pipe-liner 20 can also be done by proximity switches and electronic devices such as elements 234a and 234b and 257a and 257b, also by spring devices shown therein.

Known means of facilitating construction of items of this invention are available and devices such as thermostats, electric switching, circuitary, and actuating devices for elements of the apparatus may be used.

Vessels 81, 82, 83, 84, 85, 86, 87, 88, 89, and 90 comprise tanks in which the raw materials of the concrete, or "Resincrete" concrete, polymeric resin compositions, and "Elastomercrete" concrete are provided. Each formulation can be made by release of required amounts of material or resin into the proper mixer for use in the extruder. The resulting composite concrete pipe product is made by the combination of materials and/or force systems as a reinforced concrete pipe product.

Another additional feature is shown in FIG. 6. A series of reels or rolls of linear reinforcing 7 are placed around the extruder laminating machine and fed into the construction being made by means of ports in element 48b. The linear reinforcing 7 may be glass fiber roving, glass fiber cables, metal cables, wire, synthetic fibers, organic fibers, inorganic fibers, composite reinforcements of glass fibers and other materials, e.g., glass fibers and boron filaments, tungsten sub-strate core and boron filaments, nylon-boron filaments, ceramic fibers, aluminum-silicate fibers, and in general any linear reinforcement or combination of reinforcements adapted to being processed as shown herein.

The reinforcement may be prestressed preloaded by mechanical means, thermal means or by chemical means, each alone or any together in combination. The linear reinforcement 7 may be prestressed preloaded in the machine by means therein, e.g., by being anchored in the set plastic material 47b and being it is pulled forward in said material 47b as said material 47b is added from vessel 44b.

Figure 7:
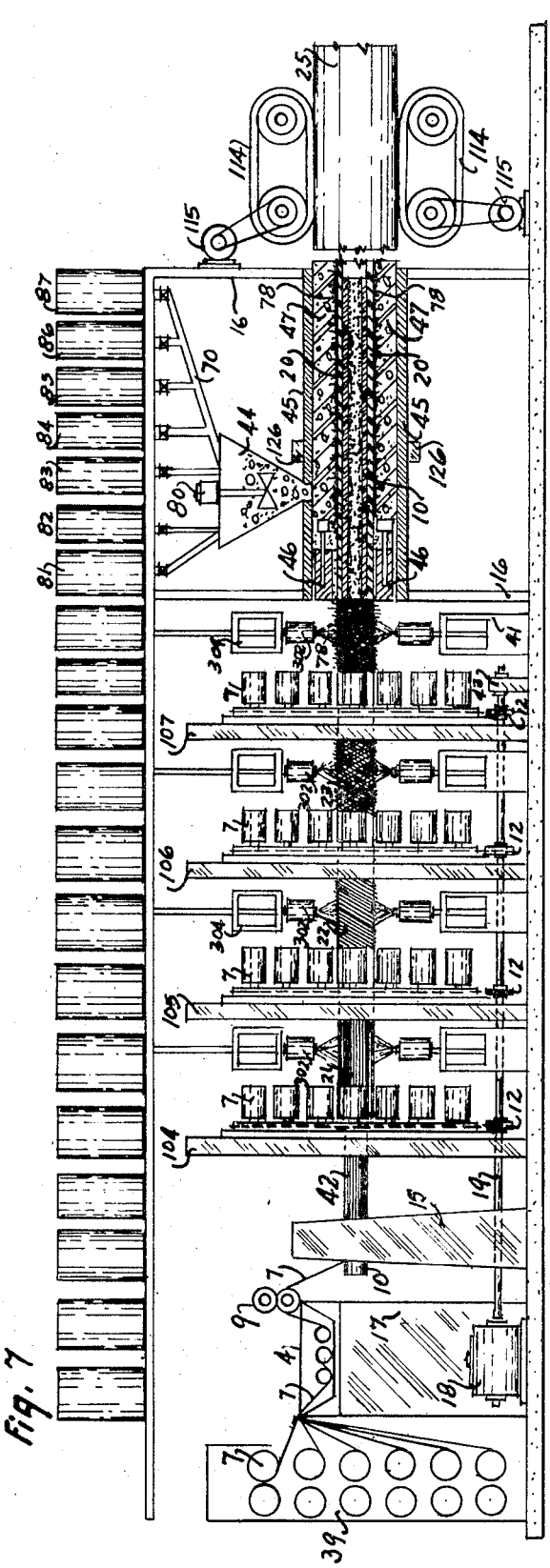
FIG. 7 is an elevation and partial section of a complete plant for manufacturing extrusion laminated composite concrete pipe.

FIG. 7 shows features of the apparatus brought together into an integrated machine to show a continuous process for the principle production of pipe of the invention. Finished pipe 25 is supplied from this machine in long lengths cut as desired when the machine is used in a fixed factory set-up. It is particularly used when the machine is mounted on a trailer or on a boat and is used to lay continuous lengths of pipe-line in a trench or in submerged parts of a stream or in the oceans. The greatest economy is found in making the pipe on site.

Figure 8:
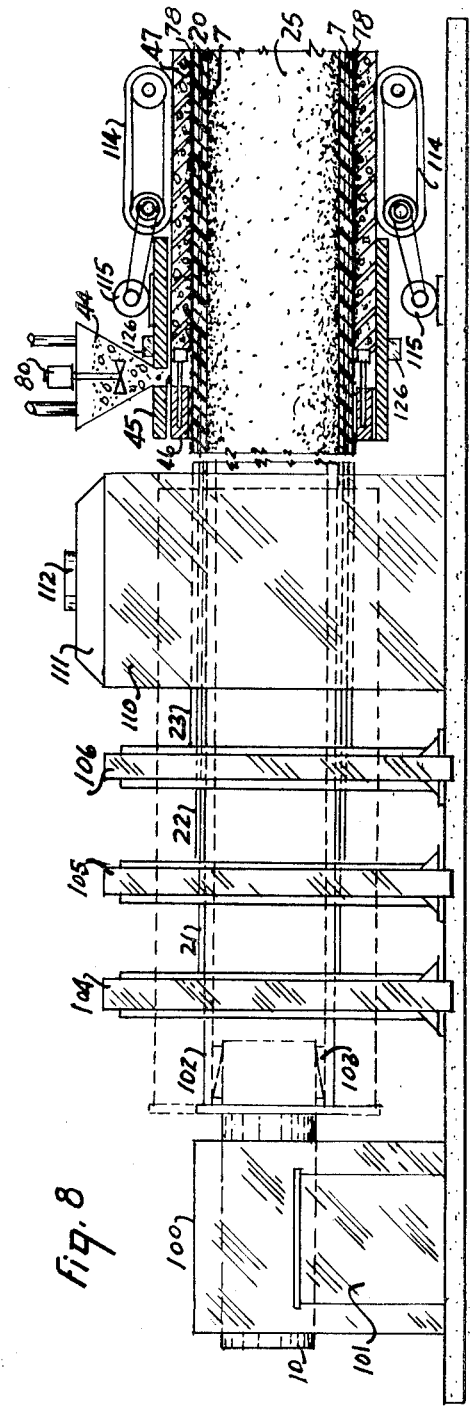
FIG. 8 is an elevation and parital section of another type of plant for manufacturing pipe of the invention.
Figure 9:
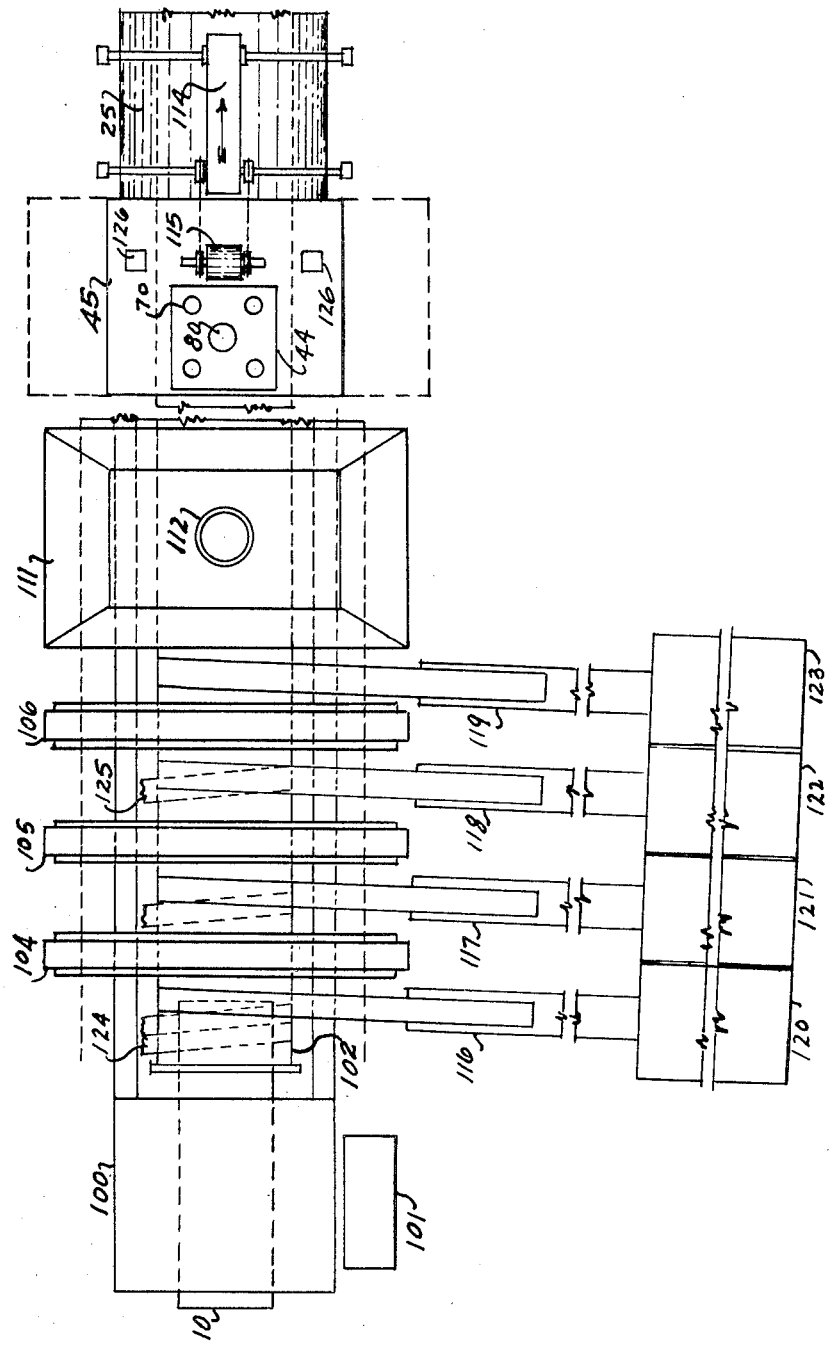
FIG. 9 is a plan view of FIG. 8.

A fixed mandrel 10 may have an internal heating means, for example strip heaters, or it may feed into an oven, or electronic or dielectric heat curing means as is shown in FIGS. 8 and 9. The mandrel is supplied with glass fiber roving or other selected fibers or wire strands, or a combination thereof, from a creel unit 39. A means for heat drying the roving or other fiber may be supplied with the creel.

An impervious film layer or a resin rich corrosion resistant plastic layer may comprise a thermoplastic resin composition such as a polyvinyl chloride film, or a polyethylene terephthalate (Mylar) film, or a butyl rubber layer, or a polytetrafluoroethylene or other fluoride type resin composition or film or corrosion resistant material layer. This may be applied as the first layer or interleaved as a layer between other layers of the construction. This layer may be a mold release layer.

A plurality of winding means elements 104, 105, 106, and 107 are shown in FIG. 7 wherein, e.g., a longitudinally placed layer 21 of glass fiber over a gel coat followed by a helical layer 22 of glass fiber, followed by an opposite layer helically applied layer 23 is wound on mandrel 10. These layers are bound in place and the entrained air which might accompany such winding is removed by layer 24 comprising a circular lay at or near 90° wind. The wound layer made composite pipe or pipe-liner 20 can be cured to a selected state of cure of partial curing or it can be fully cured as selected. The pipe liner product is pulled from the mandrel and fed into extruder-laminating machine and a layer or plurality of layers 47 comprising a concrete or resin-crete or elastomer-crete concrete is bonded to pipe-liner 20. Resin mixing heads 302 supply resin composition to the glass fibers and bonding resin 78 can be supplied just prior to entering the extruder-laminating machine. Concrete material 47 is mixed in mixer chamber 44 by mixer 80 from material supplied from tanks 81, 82, 83, 84, 85, 86, and 87, or any of them. Heating means 48 as shown in FIG. 1 may be used in the mandrel 10 or other means of curing may be used as shown supra. Consolidation means 46 may be a plurality of hydraulic units or vibrator means 126, or whatever the art shows so that concrete 47 is moved forward from the mixer and is pressed into engagement with the glass fiber reinforced pipe-liner body 20. The body of the extruder 45 may contain heating elements so that the completed pipe 25 leaves the extruder ready for use.

A moving means comprising motor 115 driving pull off device 114 can remove the pipe 25 as it is completed in the machine. Other devices of the art for removing the pipe can be used.

FIGS. 8 and 9 show a diagrammatic illustration of a turning mandrel type machine coupled to an extruder-laminating machine of my invention. The drive unit is housed in cabinet 100 and drives mandrel 10 which is fed from winding elements 104, 105, 106, 116, 117, 118, and 119.

Drive mandrel 10 drives forming mandrel 102 which is held in place by holding means 103 which can be any form of connecting or holding means so that forming mandrel 102 can be changed for different diameters of mandrel easily. Rotating winding means rings 104, 105, and 106 supply the axial reinforcement strands with fiber impregnating being done in elements 116, 117, 118, and 119, the fiber being supplied from creels 120, 121, 123, 122. Separating film, e.g., polyethylene terephthalate (Mylar), or cellophane or other release type film 125, surface mat or liner, e.g., polyvinyl chloride film 125, or other liner means are supplied to the mandrel. Cabinet 101 contains control equipment and instrument board. The operation of the machine and control over winding, etc., is done at this point. The resin is supplied from a mixing means having rotary pumps each with an individual motor and meters control the amounts of catalysts and copolymerizable materials used. The impregnating means also houses the mixing means, which means includes squeeze rolls and guiding rolls and resin level and temperature controls automatically operated from the control cabinet. The winding tension is controlled by roving or tape tensioners. The drive motor and speed control gears are operated by electronic means which gives infinite speed variation from low to high speeds accurately and device is provided which shows the operating speeds at any time so that means at the control desk figures rate of production then being made. The oven 111 with vent 112 may have heating means selected from the group of means comprising electric heating means, infra-red heating means, gas fired heating means, in fact any useful type of heating means. Not shown but available are diamond saw cutting means with or without water cooling means, or carborundum wheels may be used. Other features known in the art may be used.

Connected to the system extruder-laminating machine 45 having mixer 80 operating in mixer chamber 44 which is fed by a plurality of feed tubes 70 combines the polymeric resin composition bound glass fiber or other wire or fiber reinforcement 20 with extruder-laminated material concrete 47 to form the completed pipe. A plurality of layers 47 may be used as shown in FIG. 5. Depending upon the design, the polymeric resin composition may be in a partially set condition or fully set as it feeds into the extruder-laminating machine. The finished product is pulled from the machine by puller 114 operated by motor 115 and is deposited directly into a ditch or water way or it may be cut to length and shipped to point of use. The preferred and most economical way is to manufacture the product on site and place the pipe-line directly into the ditch. A ditch is dung by a ditcher and the trailer having the combination filament winding or other type of fabricating means for providing the pipe-liner construction is pulled by the tractor unit of the ditcher so that a ditch is not left open for a rain or spalling off of its sides to occur and cause expense in clearing the ditch. When a barge is used to manufacture on, or a boat, the product pipe-line is layed directly in place of final use, e.g., a pipe-line from shore to an oil-well drilling rig located off shore, and supplying a tank farm for storage of the pumped oil.

There are advantages inherent in glass fiber pipe-liner construction and in lightweight concrete made with polymeric resin composition binders. A filament wound pipe component of the invention has a specific gravity of about 1.75 to 2.5 depending upon the construction and density and pressure rating. With water at 1.0 specific gravity relatively will vary from 0.4285 to 0.6. Crude oil has a specific gravity from 0.675 to 0.825. The specific gravity of steel is about 7.8. Considering the tensile stress induced into a submerged pipe line as in a catenary of a suspended pipe-line in water, a filament wound glass fiber polymeric resin composition bound pipe is about 3.5 to 4.5 times better than a steel pipe in resisting pipe-line tensile stresses. Even if the factor of safety of steel is doubled for the glass fiber pipe constructions, glass fiber pipe constructions are still about 3 or at least 2 times better in long operating stress and fatigue. Corrosion reduces steel values from original strength, while glass fiber pipe is non-corrosive in salt water of an ocean.

Steel pipe lines are only made with joints at say 20 to 40 feet apart while glass fiber pipe composite materials of this invention can be made in long continuous lengths. Joints also "work" in use and require maintenance so that a continual expense is required to use pipes made of steel.

By using the "Resincrete" or "Elastomercrete" concrete polymeric resin composition bound concrete and glass fiber pipe-liners of the invention as an embodiment of structure can be provided at weights providing buoyancy. For example, a perlite concrete, or expanded shale concrete made with polymeric resin binders will have a specific gravity from about 1.50 to 5.0 as against steel of specific gravity of 7.8.

Alternate construction is in order since a heavy concrete may be made as for example, a lead filled or heavy mineral filled concrete made for specific purposes such as for example, the carrying of atomic wastes to deep water disposal.

The features of the elasticity of a pipe-line structure may be easily controlled in the design of structure by the polymeric resin, elastomer resin or rubber resin used. Epoxy resin pipe can have a relatively low modulus of elasticity from about 1.50 to $2.5 \times 10^6$. Bending can occur from say 7° to 15° gyration amplitude in to and from cyclic bending due to wave movement or stream flow movement and not cause excessive fatigue to failure. By balancing the force systems of the glass fiber polymeric resin composition construction with the mineral or other filler aggregate used, "Resincrete" or " "Elastomercrete" concrete of the invention provides a very useful construction. by using the prestressing of prestressed preloads into the constructions made as shown in my prior art of issued patents and patents pending additional functional features are provided in the instant invented pipe.

The same properties just disclosed supra are useful in pipe-lines placed in earth trenchs on dry land. Earthquakes, soil movements, expansion of materials as from temperature changes, sonic boom forces, etc., are compensated for by an elasticity of structure made in the products of the invention. In cold climates of the artic, composite polymeric resin composition glass fiber pipelines are made with resin systems adapted to such use. The handling of crushed and powdered materials or mined materials from the ocean bottom can be moved in fluid at a low cost. Coal, ore, sand, fish, minerals, etc., e.g., 2" to 3" for heavy materials to much larger sizes for lighter materials can be moved cheaply in the pipelines of the invention, and this at no or low costs of maintenance and operation due to the inherent advantages of polymeric resin composition fiber pipe-line of this invention.

The products of the invention may be applied for uses as deep well casings, atomic energy deep tube casing for testing atomic materials, waste disposal wells, piling for structures, especially in ocean water, brine well casings, oil well casings and other vertical uses.

FIGS. 10, 11, and 12 show a portion of a complete plant as shown in FIGS. 7, 8 and 9 that comprises a pipeliner forming apparatus not shown in this FIG. 10 but shown in the various embodiments of apparatus shown on FIGS. 1, 2, 3, 4, 5, 6, 7, and 8, each as selected connected to the apparatus of this FIG. 10. In this embodiment the apparatus comprises an extruder-laminating machine working in combination with a prestressing device for inducing mechanically induced prestressed preloads into the composite concrete pipe then being made. The extruder-laminating machine also controls production so that chemically induced prestressed preloads are captured along with mechanically induced prestressed preloads as beneficial components of structure of the composite concrete pipe then being made.

Pipe-liner 20 is delivered to the extruder-laminating machine from the mandrel, or otherwise as in FIG. 5 and FIG. 4, or as made from the fibrous construction laminating apparatus selected from figures given supra.

For example, apparatus of FIG. 7 is combined with the apparatus of FIG. 10. Glass fiber cable 7, or steel cable, or prestressing cable or wire of any kind, is covered and impregnated with bonding resin composition 78 which may be selected for a particular amount of shrinkage or other desirable property, or preferably, a selected resin 191 contained in impregnating and anchorage vessel 190. The resin composition may have a particular amount of shrinkage, e.g., 7% on cure. It might be a self extinguishing fire resistant resin such as a chlorinated polyester resin, or an epoxy-polyamide resin, etc. The cables 7 are threaded through the extruder-laminating machine until all cables 7 are in place. The cables 7 may be without cover so that a bonded connection to concrete 47 is had while the cables 7 are in a state of tension. Alternately, the cables 7 may be supplied in a flexible conduit or a plastic resin sheath such as polyethylene or other non-bonding plastic sheath, and the prestressing preload then being applied as a post-tensioning applied prestressed preload rather than a pre-tensioning prestressing preload as in bonded prestressed construction.

The prestressing apparatus shown in these figures comprise elements 170, 171, 172, 173, 174, 175, 177, 179, and 192 act together with extruder chamber element 145 to provide means to prestress preload cable elements 7 and the concrete material 47 and pipe liner 20. As is shown herein the entire apparatus comprising mandrel, extruder and laminating machine and the prestressing apparatus work in unitary operation to make the product of the invention.

In FIGS. 10, 11, and 12 eight cables 7 are shown, but there may be any number. The apparatus in resin vessel 190 acts as a snubbing means for stopping payout of cables 7 while prestressed preload is applied. Other known means for this feature may be used. The cables 7 may have enlargements 77 at their ends so that load transfer may be placed into holding bar 175 by means of hydraulic jack 179 or any other desired pulling means known. The hydraulic jack 179 is actuated by hydraulic pump not shown, or it may be actuated by an air pressure means. The plunger 192 is forced against head bar 170 which bears on the end of the extruder-laminating machine. The head bar 170 is connected to bearing bar 171 to the hydraulic jack holding bar 173 to prestressing apparatus holding bar 175 through separating bearings 174. Bolts 172 and 177 hold the bars 170, 171, 173, and 175 and separating bearings 174 together in pre-arranged condition allowing a space between bars 170 and 171 to be provided for compression by plunger 192 of the hydraulic jack 179. This space is calculated to measure a certain length when selected pressure is induced into the hydraulic jack 179 by its hydraulic pump not shown. The pump can be connected to an electronic control actuated at the control desk so that precision prestressing can be had in controlling loadings and for quality control of product made.

Figure 13:
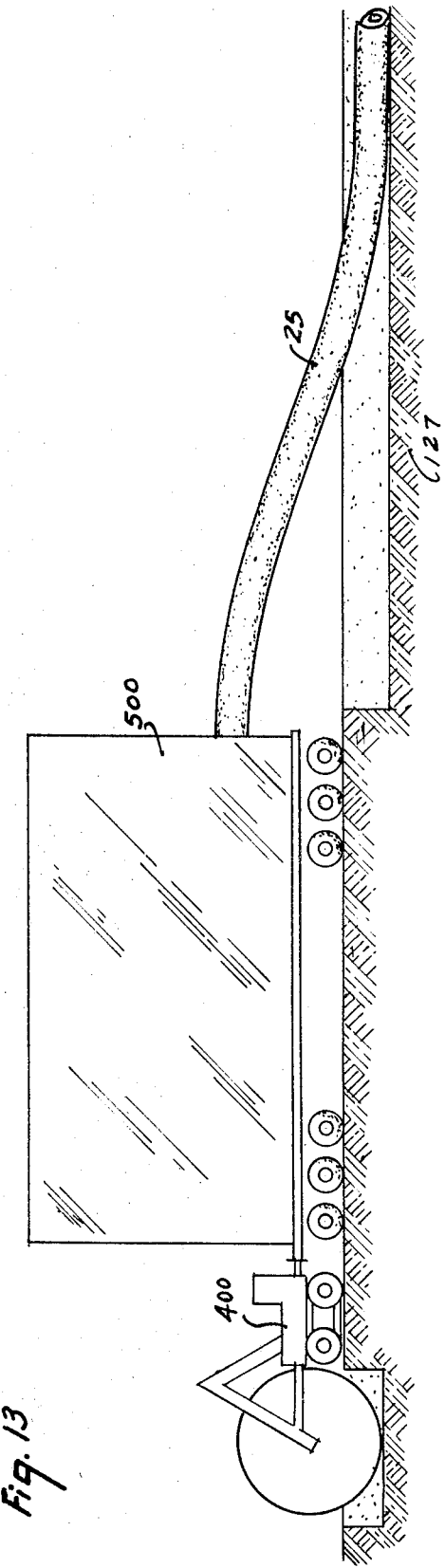
FIG. 13 is a general view elevation of the invention apparatus in a trailer housing including in combination with a tractor-trailer-ditcher machine for moving, ditching and laying means.

With the prestressed preloads under control and partially or fully induced as selected by design, the mixer 80 is activated which in turn activates the material feeder valves to feeder pipe 70 of FIG. 7 and a selected amount of concrete mix of aggregates and polymeric resin composition is mixed in mixer 80. As the mixture of concrete 47 is mode it is fed into the extruder-laminating machine chamber 145 and is vibrated into place by vibrators 126 and over pipeliner 20 which is already in place and against holding means 170. Bonding resin 78 has been placed on pipe-liner 20 as it is threaded into the extruder-laminating machine chamber 145. The concrete material 47 is filled into chamber 145 by the vibrators 126 or it may be placed by hydraulic rams as shown in FIG. 13 at 46. The cables 7 are embedded and covered with the concrete material 47 from vessel 44 and the laminated concrete 47 is bonded to the pipe-liner 20 by the resin in the concrete and the bonding resin 78. In certain formulations of resin used, bonding resin 78 may be omitted because the resin in the concrete 47 does the bonding and makes the interface structure of the pipe-liner and concrete 47 into unitary structure, particularly when pipe-liner 20 is in a partially cured state.

Alternately, a portland cement concrete 47 may be used. In this case it is well to attach a steam curing or other cement curing means to the means of manufacture to cure the portland cement concrete component of the pipe made.

The extruder chamber 145 may contain a heated platen 187 which is heated by strip heaters 180, or by dielectric heat, or infra-red heat, or hot oil, or hot water heat, or radiation means, or any other useful heating means, to a selected temperature and the polymeric resin composition of the embodiment then being made is rapidly cured, e.g., in 3 minutes at 300° F. For example, it is calculated that the production of prestressed preloaded composite concrete pipe can be delivered from 2 to 5 feet per minute depending upon the resin system used and the curing means employed. The heat curing means is insulated from the curing chamber of extruder chamber 145 by insulation 181. The apparatus when used for long length continuous manufacture has additional apparatus not shown and separator means so that the prestressing apparatus can be advanced the length of the extruder in increments. This advance is made so that a small portion of the finished pipe is left in the extruder laminating machine where it acts as the bulkhead in place of holding bar 170 and the extruded finished pipe then acts as it did with holding bar 170. The prestressing means is mounted on a track or trailer of boat and is not removed until enough pipe is made to drop into a trench or in a water site.

Alternately, the prestressing apparatus may be used for post-tensioning of the cables 7 particularly when they are placed in covers or sheaths that permit stretching after the pipe is made. With the first unit made in the extruder-laminating machine and it being advanced as described supra, the cavity of the machine is again filled from mixer 80 and the process repeated. With certain specified types of curing agents and curing means known, it is possible to use the machine in a continuous nonstop production process. Such a system may use both thermosetting and thermoplastic polymerizable polymeric resin compositions and may include combinations of such resins and modifiers and setting agents.

By using a computer in combination with the whole apparatus, the manufacture can be automatically controlled and uniform quality and production rates established through control board 101. The extruder-laminating machine is a relatively short machine and operates on cycle determined by the curing features and characteristics of the polymeric resin system selected. The head bar 170 can be sized for the largest pipe made and the extruder-laminating machine can be made in segments and be adjustable to selected diameters for said composite concrete pipe manufacture. Also the shape of the pipe can be elliptical shape, square, hexagonal, or octagonal or any other shape practical for manufacture in the apparatus.

FIG. 13 shows a general view of land based apparatus of the invention comprising a ditching means 400 having a moving means and ditcher which also pulls the processing trailer 500. The selected apparatus shown in prior FIGS. 1–12 as required for any given embodiments of the invention are assembled on the processing trailer 500 in operating condition and the completed pipe-line 25 is layed from the processing trailer into the earth's environment 127 ready for use.

Figure 14:
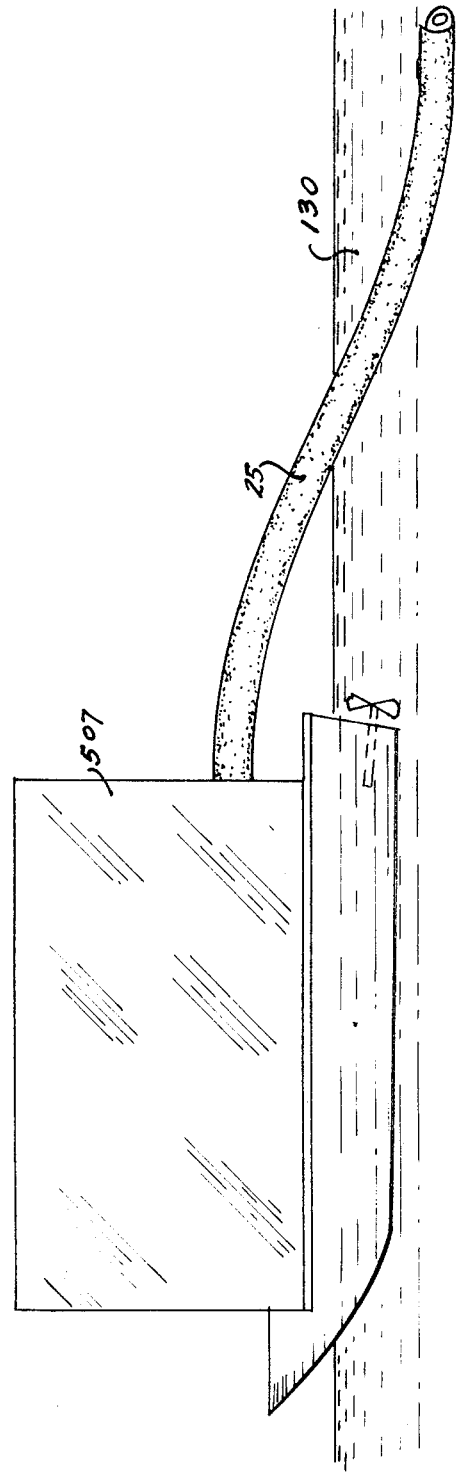
FIG. 14 is a general view elevation of the invention apparatus in a trailer housing in combination with a boat for moving and laying means.

FIG. 14 shows a general view of a water borne processing rig 507 comprising a boat for moving means and having selected apparatus of FIGS. 1–12 mounted thereon. Completed pipe-line 25 is layed into an earth's environment, e.g., water 130.

To further illustrate the invention, the following examples are given but obviously are not the limits of the invention, as many more examples may be used.

Example I

| | |
|---|---|
| Polyester resin—Atlac 382–05 __ parts by weight__ | 75 |
| Polyester resin—Atlac 387–03 _____do____ | 25 |
| Total _____ | 100 |
| Benzoyl Peroxide—USP-245 percent on the resin__ | 0.5 |
| ASP-400 Clay _____ parts by weight__ | 25 |
| Silica flour _____do____ | 15 |
| Surfacing mat—40 mls _____oz. per sq. ft.___ | ½ |
| Filament wound 30 end roving in 56.75° opposed helical winding, per wind. Use 5 lb. tensile pull on roving _____oz. per sq. ft.___ | 1.0 |
| Filament wound 30 end roving in 90°—circular winding. Use 7 lbs. tensile pull on roving oz. per sq. ft. _____ | 1.0 |

Atlac 382–05 and 387–03 are unsaturated polyester resins made with Bisphenol-A fumarate polyester resins covered by U.S. Pats. Nos. 2,634,257 and 3,214,491, respectively.

On an aluminum mandrel place a polyvinyl chloride film of 10 mil. sheet on said mandrel for a release sheet. On this release sheet place a layer of above resin composition mix and embed the surfacing mat so that a 35% glass fiber surfacing mat and 65% polyester resin composition comprise said layer. While this layer is in unpolymerized state, filament wind the two helical layers of 30 end roving in opposed laminated layers and cover these layers with the layer 30 end roving in minus 90° circular winding. Bring this laminated construction comprising a pipe-liner construction to a partially cured condition whereby it can be removed from the mandrel as made and fed into the extruder-laminating machine.

Apply a bonding resin composition layer as entry is made into the extruder-laminating machine and laminate with a concrete mix as follows:

| | Parts by wt. |
|---|---|
| The above resin composition _____ | 35 |
| Silica sand—60 mesh 50%; 30 mesh 30%; 16 mesh 20% _____ | 65 |

Alternatively, use the above resin compostiion and filler with as much perlite as the resin composition will hold and still flow into the extruder-laminating machine from the mixer 80 and be compacted as required.

Alternatively, use the above resin composition and filler with concrete sand 30%, expanded shale aggregate 30% and perlite 40% and add not over 5% styrene monomer to keep the mix flowable from the mixer. Adjust mix design for workability because sand varies and shale varies.

The aluminum mandrel should be heated to 250° F. on completion of the filament winding or it may be continuously heated at 180° F. and state of curing watched for removal of the pipe-liner at the desired stage of cure. On a continuous process this time should be about 2½ to 3 minutes. The concrete laminated layer can be from ½" thick to say 3" thick and the composite concrete pipe should work at 400 ft. of head, that is, allowing for a factor of safety.

The expansion of the aluminum mandrel induces a prestressed preload into the pipe-liner as made. A water cooled mandrel can be used if pipe-liner tends to stick to the mandrel.

Example II

In the place of the polyester resin system of Example I above the following resin system may be used with all other elements being the same.

| | Parts by weight |
|---|---|
| Epoxy Resin 828 Shell _____ | 60 |
| Polyamide Resin—Versamid 140 _____ | 40 |
| DMP 30—Tridimethyl amino methyl phenol. _____ | 5 |

Epoxy resin, Shell 828, is a light colored, epichlorohydrin bisphenol-A type liquid epoxy resin having a melting point of 8–12° C. (Duran's mercury method), Gardner color index of 12 max., viscosity—Gardner-Holdt of $Z_5$–$Z_6$ and epoxide equivalent of 190–210, weight per gallon of 10.27 lbs., refractive index of 1.583 and equivalent weight of 100 grams of resin required to completely esterify one gram-mole of monobasic acid, e.g., 280 grams of $C_{18}$ fatty acid or 60 grams of acetic acid.

Add not over 5% vinyl toluene to control flow of concrete mix.

Alternatively, omit polyvinyl chloride film and use polyethylene terephthalate (Mylar) and bond the same to the surfacing mat layer, and this for the purpose of making an impermeable liner.

Example III

In place of the Resincrete polymeric, resin bound concretes of Examples I and II, use a 5,000 p.s.i. compression portland cement concrete made of not over ⅜" sized fire expanded clay particles, sand and cement. Use known accelerator to speed up cure and place finished pipe in curing room as made. In this case complete cure of the fiber glass pipe liner and use bonding resin 78, an epoxy polymide resin composition of Example II for said bonding resin 78.

Example IV

For a deeply placed pipe-line in the ocean, use a concreate made out of epoxy resin composition and glass beads.

| | Parts by weight |
|---|---|
| Epoxy resin—Shell 828 | 30 |
| Polysulfide rubber resin—Thiokol | 70 |
| Total | 100 |
| Glass beads, on the resin | 70 |
| Expanded shale, on the resin | 30 |

Example V

| | Parts by weight |
|---|---|
| Epoxy resin—Shell 828 | 60 |
| Polyamide resin—Versamid #140 | 40 |
| Silica sand 16 mesh | 50 |
| Silica sand 30 mesh | 50 |
| Silica sand 60 mesh | 50 |
| Perlite | 100 |
| Fire expanded shale ⅜" mesh | 100 |

(Vary amounts of aggregates to get workability of the materials due to local variability binding characteristics of materials used.)

Resin portion can be varied—make samples test for compression until selected strength is found. Resincrete concrete from 1,000 p.s.i. to 15,000 p.s.i. and above can be made.

Wherever in the claims I have cited the term "polymeric resin composition bonded concrete," said term is intended to include "resin-crete concrete, elastomeric-resin concrete, resin-bound concrete, and elastomer-bound concrete."

There are many polymeric resin compositions which may be used alone or in compatible combinations, or in functional uses in individual layers or in combined layers of the made pipe structure. The resins, elastomers, and rubbers compositions include unsaturated polyesters, epoxy resins, polyester resins, polyurethane resins, acrylonitrile-styrene resins, acrylonitrile- butadiene- styrene copolymer resins, acetal resins, acrylic resins, alkyd resins, allyl resins, amino resins, polyamide resins, polysulfide resins, butyrate resins, rubber resins, cellulose-acetate resins, cellulose-acetate-nutyrate resins, cellulose nitrate resins, cellulose propinate resins, cellulose triacetate resins, chlorinated polyesters, chlorinated polyether resins, polypropylene resins, polyethylene resins, urethane resins, vinyl resins, rigid vinyl resins, vinyl chloride-vinyl acetate resins, ethyl cellulose resins, expandable polystyrene resins, cellular vinyl resins, polyallomers resins, polycarbonate resins, polyvinyl dichloride resins, polyurethane elastomers, resins, phenolic resins, urea-formaldehyde resins, furane resins, phenoxy resins, nylon resins, silicone reins, fluoride resins, and compatible combinations of any thereof.

Epoxy resins having a curing agent therefor, polyester resins, polyvinyl chloride resins, polyurethane resins, phenolic resins, make many preferred embodiments of the invention and embodiments may have several resins used in making a product.

Fillers and aggregates used include glass flakes, glass beads, silica sand, concrete sand, concrete aggregates, fire expanded shale, fire expanded clay, pumice, scoria, vermiculite, clay, perlite, crush rock particles, organic fillers, lead powder, metal powders, grits, wood flour, chopped glass fibers, metal pieces.

Very high strength concrete can be made using ceramic fillers, silicon carbide single crystal fibers, tungsten substrate core and boron filaments, boron fibers, sapphire whiskers, asbestos fibers, (Fibrefrax) ceramic spun fibers, nylon filaments, nylon-boron filaments, ceramic fibers, aluminum-silicate fibers, polyethylene terephthalate fibers, acrylic fibers, glass flakes, glass beads, acid resisting minerals, alkali resisting minerals, acid resisting sand, pumice, vermiculite, perlite, tufa, volcanic cinders, man-made cinders, scoria, quartz particles, lead powder, metal powder, and metal wires.

Whiskers are defined as extremely thin single crystal fibers produced under controlled growth conditions developed during the past decade. Whiskers have polygonal cross section, exhibit a high degree of structural perfection and presently are produced in diameters ranging from 1 to 30 microns (a micron equals 0.0001 centimeter). Tests on sapphire whiskers (sapphire is the term used to describe gem variety of aluminum oxide) show tensile strengths greater than six million p.s.i. and a Young's Modulus of Elasticity in tension greater than 100 million p.s.i. Whiskers are made of raw materials comprising inexpensive powder, water and clay. A full description of whiskers is found in the Modern Plastics Encyclopedia—1968 edition—pages 590–606 along with other fibers used in this invention.

Other polymeric resins which may be used are epocryl resins, epoxypolyamine resins, epoxy-polyamide, resins, epoxy-polysulfide resins, epoxy-coal-tar resins, epoxy-vinyl chloride resins, epoxy-asphaltic resins, epoxy-silicone resins, epoxy-fluroinated resins, epoxy-phenolic resins, epoxy propylene resins, epoxy-polyethylene resins, epoxy-isocyanate-polyurethane resins, epoxy furfural resins.

The bonding characteristics of the glass fiber pipe-liner can be materially increased by winding spaced enlargements comprising cable-like groupings of additional glass fiber strands around the pipe-liner to provide ridge-like extensions from its surface. The extensions act as do cables wound around the pipe-liner to strengthen it as well as being additional bonding means.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

Having described the invention, I claim:

1. The method of making an extruded and laminated prestressed reinforced composite concrete pipe construction which comprises the steps of:
    step (1), first apply a layer of mold release onto the surface of the mandrel portion of a laminating and extruding machine;
    step (2), apply on said mold release a layer of polymerizable polymeric resin composition and form thereby a resin-rich gel coat layer and gel said gel coat layer against flow;
    step (3), over said resin-rich gel coat layer apply a plurality of glass fiber strands under tension covered and impregnated with a polymerizable polymeric resin composition and at least partially cure said polymeric resin composition thereof and make thereby a reinforced plastic pipe-liner construction;

step (4), cover said pipe-liner exterior face with a bonding resin composition in a polymerizable state;

step (5), insert said pipe liner on said mandrel into an extruder and extrude around and about said pipe liner a selected quantity of flowable concrete material comprising any aggregate structural material having a binder such as portland cement concrete material, clay material, and polymeric resin composition bonded concrete, said polymeric resin composition bonded concrete examplied by a mixture of polymerizable polymeric resin composition and an aggregate selected from the group consisting of sand, lightweight concrete aggregates, perlite aggregates, fire expanded clay aggregates, fire expanded shale aggregates, pumice aggregates, vermiculite aggregates, cinder aggregates, volcanic cinder aggregates, scoria aggregates, tufa aggregates, quartz particles, crushed rocks, and minerals, each mixture and compatible mixture combinations thereof having a polymeric resin composition as a binder, and said polymerizable polymeric resin composition having a curing means therefor, step (6), induce by pressure means of said extruder a state of internal stress into said concrete material and into said pipe liner and embed particles of some of said concrete materials by said pressure into said bonding resin composition and said pipe liner and while said material is in said state of internal stress, cure said polymerizable polymeric resin composition, and thus bond together to a set and cured state into a unitary pipe structure said pipe liner, said bonding resin composition, said concrete material, and said induced internal stress comprising prestressed preload of said pipe construction making said pipe ready for removal from said extruder and laminating means, and remove same ready for use.

2. The method of making an extruded-laminated prestressed reinforced composite concrete pipe construction as in claim 1, in which in addition extrude and a polymerizable polymeric resin composition containing substantial amounts of filler and fiber reinforcements and provide said combination of materials as a polymerizable layer over said concrete layer and compress and bond said layer to said concrete layer and form thereby a laminated sandwich construction.

3. The method of making an extruded and laminated prestressed reinforced composite concrete pipe construction as in claim 2, in which in addition embed and cover with said polymerizable polymeric resin composition at least one longitudinal reinforcing strand selected from the group consisting of glass fibers, glass fiber roving, glass fiber cables, metal cables, wire, synthetic fibers, fibers, glass fibers and boron filaments, under tension in said filler-fiber reinforced polymerizable polymeric resin composition.

4. The method of making an extruded-laminated prestressed reinforced composite concrete pipe construction as in claim 1, in which said concrete is selected from the group consisting of portland cement bonded concrete material, polymerizable polymeric resin composition bonded material, elastomer resin bonded material, and rubber and rubber-like materials bonded concrete material.

5. The method of making an extruded and laminated prestressed reinforced composite concrete pipe construction as in claim 2, in which in addition extrude, compress, laminate and bond an external protective layer over said sandwich construction, said external protective layer comprising a polymerizable polymeric resin composition containing substantial amounts of protective material and fiber reinforcements.

6. The method of making an extruded-laminated prestressed reinforced composite concrete pipe construction as in claim 5, in which said protective layer materials are selected from the group consisting of sand, acid resisting minerals, alkali-resisting minerals, fire expanded clay aggregates, fire expanded shale aggregates, pumice, vermiculite, perlite, metal powders, lead powder, lead particles, selected crushed rocks, said protective layer materials bound together by selected polymerizable polymeric resin compositions.

7. The method of making an extruded and laminated prestressed reinforced composite concrete pipe construction as in claim 1, in which polymerizable polymeric resin compositions are selected from the group consisting of thermosetting polymeric resin compositions, thermoplastic polymeric resin compositions, and compatible combinations of thermosetting and thermoplastic polymeric resin compositions.

8. The method of making an extruded and laminated prestressed reinforced composite concrete pipe construction as in claim 1, in which in addition vibrate and consolidate said concrete materials as they are placed in use.

9. The method of making an extruded and laminated prestressed reinforced composite concrete pipe construction as in claim 1, in which in addition the polymerizable polymeric resin composition has a selected shrinkage and in addition exert a shrinkage and said pressure providing combined beneficial force systems captured in said polymeric resin composition bonded concrete and the said glass fiber polymeric resin composition bonded pipe-liner as useful prestressed preload comprising a component of the structure of the said pipe and increasing its resistance to load and impacts of dynamic energy.

10. The method of making an extruded and laminated prestressed reinforced composite concrete pipe construction as in claim 1, in which in addition an impermeable layer of material impermeable to water is laminated to said pipe liner.

11. The method of making an extruded and laminated prestressed reinforced composite concrete pipe construction as in claim 1, in which in addition a corrosion resistant material layer comprises the first layer applied on the mandrel surface.

12. The method of making an extruded and laminated prestressed reinforced composite concrete pipe construction as in claim 1, in which in addition embed and cover with said polymerizable polymeric resin composition reinforcing strands selected from the group consisting of glass fibers and boron filaments, tungsten substrate and boron filaments, nylon filaments, nylon-boron filaments, ceramic fibers, aluminum-silicate fibers alone and in combination with synthetic fibers.

13. The method of making an extruded and laminated prestressed reinforced composite concrete pipe construction as in claim 1, in which in addition extrude and laminate said concrete compressing an aggregate a filler-fiber reinforced polymerizable polymeric resin composition layer including reinforcing material selected from the group of materials consisting of glass fibers, hemp, sisal, cotton, nylon, polyethylene terephthlate, acrylic fibers, aluminum-silicate fibers, ceramic spun fibers, silicon carbide single crystal fibers, boron fibers, asbestos fibers, sapphire whiskers, refractory fibers, and glass flakes.

14. The method of making an extruded and laminated prestressed reinforced composite concrete pipe construction as in claim 1, in which in addition pull a plurality of prestressing reinforcing elements through said extruder at a selected distance from the surface of said pipe-liner after moving said bonding resin covered pipe-liner over said supporting means and induce and hold a prestressed preload in said prestressing reinforcing elements while flowing and extruding said selected quantity of prepared consistency concrete material over said bonding resin composition covered pipe-liner and said prestressing reinforcing elements and in said means and compress and laminate under pressure and induce a state of internal stress into said concrete material and into said pipe-liner and into said prestressing reinforcing elements and bond all said materials under said internal stress into a unitary structure.

15. The method of making an extruded and laminaated prestressed reinforced composite concrete pipe construction as in claim 2, in which said fibers of said fiber reinforcements are selected from the group consisting of glass fibers, hemp, sisal, cotton, nylon, polyethylene terephthalate fibers, acrylic fibers, aluminum-silicate fibers, ceramic spun fibers, silicon carbide single crystal fibers, boron fibers, sapphire whiskers, refractory fibers, asbestos fibers, and glass flakes, said materials being used in selected combinations of materials.

References Cited

UNITED STATES PATENTS

| | | | |
|---|---|---|---|
| 3,250,654 | 5/1966 | Rubenstein | 156—171 |
| 2,053,307 | 9/1936 | Wilson | 264—173 |
| 1,888,101 | 11/1952 | Wilson | 264—173 XR |
| 2,816,323 | 12/1957 | Munger. | |

FOREIGN PATENTS 761,208   11/1956   Great Britain.

PHILIP DIER, Primary Examiner

U.S. Cl. X.R.

138—175; 156—244, 500; 264—173, 228